(12) United States Patent
Janek et al.

(10) Patent No.: US 6,253,176 B1
(45) Date of Patent: Jun. 26, 2001

(54) PRODUCT INCLUDING A SPEECH RECOGNITION DEVICE AND METHOD OF GENERATING A COMMAND LEXICON FOR A SPEECH RECOGNITION DEVICE

(75) Inventors: Gabor Janek, Budapest (HU); Heribert Wutte, Graz (AU); Manfred Grabherr, Somerville, MA (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/217,415

(22) Filed: Dec. 21, 1998

(30) Foreign Application Priority Data

Dec. 30, 1997 (EP) .................................................. 97890259

(51) Int. Cl.[7] ........................... G10L 13/00; G10L 21/00; G10L 17/21

(52) U.S. Cl. ........................... 704/231; 704/270; 704/275; 704/10

(58) Field of Search ................................... 704/270, 275, 704/10, 231

(56) References Cited

U.S. PATENT DOCUMENTS

| | | | |
|---|---|---|---|
| 5,377,303 | * 12/1994 | Firman | 704/275 |
| 5,386,494 | 1/1995 | White | 395/2.84 |
| 5,774,859 | * 6/1998 | Houser et al. | 704/275 |
| 5,873,064 | * 2/1999 | De Aramas et al. | 704/275 |
| 5,890,122 | * 3/1999 | Van Kleeck et al. | 704/275 |
| 5,915,236 | * 6/1999 | Gould et al. | 704/251 |

FOREIGN PATENT DOCUMENTS

0607615A1  7/1994 (EP) .................................. G06F/3/16

OTHER PUBLICATIONS

Schmandt et al., ("Augmenting a Window System with Speech Input", Computer magazine, 8/90, vol. 23, Issue 8, pp. 50–56). Aug. 1990.*

B.A. Myers ("Window Interfaces: A Taxonomy of Window Manager User Interfaces," IEEE Computer Graphics and Applications, vol. 8, No. 5, Sep. 1988, pp. 65–84). Sep. 1988.*

Huang et al., ("Microsoft Windows Highly Intelligent Speech recognizer: Whisper," ICASSP–95, vol. 1, May 1995, pp. 93–96).*

* cited by examiner

*Primary Examiner*—William R. Korzuch
*Assistant Examiner*—Vijáy B. Chawan
(74) *Attorney, Agent, or Firm*—Daniel J. Piotrowski

(57) ABSTRACT

In a product including a speech recognition device for controlling at least one processing unit while using a command lexicon containing commands which depends as regards its contents on an activated operating state of a processing unit and which speech recognition device includes a command lexicon memory in which commands of the command lexicon can be stored in the form of command information and identification information assigned to the latter, and which speech recognition device includes speech recognition means for detecting command information—contained in speech information representing a spoken command—and delivers command information to the at least one processing unit, generating means are provided which are arranged for generating—after an operating state of a processing unit has been activated—which may be effected with the aid of command information detected in a spoken command—a command lexicon assigned to only this one activated operating state and for storing this command lexicon in the command lexicon memory.

20 Claims, 4 Drawing Sheets

| AK | Wn | AP |
|---|---|---|
|  | W1 | EXCEL FOR WINDOWS™ |
|  | W2 | INTERNET EXPLORER™ |
|  | W3 | WORD FOR WINDOWS™ |
| ⇒ | W4 | DECISION WINDOW (WORD FOR WINDOWS™) |

| Wn | CI | TI(CI) |
|---|---|---|
| W1 | 1<br>2<br>3<br>. | FORMAT<br>PASTE<br>VIEW<br>. |
| W2 | 10<br>11<br>12<br>. | HOME<br>REFRESH<br>FORWARD<br>. |
| W3 | 20<br>21<br>22<br>23<br>. | FILE<br>VIEW<br>FORMAT<br>HELP<br>. |
| W4 | 30<br>31<br>32 | OK<br>CANCEL<br>BACK |

PRODUCT INCLUDING A SPEECH RECOGNITION DEVICE AND METHOD OF GENERATING A COMMAND LEXICON FOR A SPEECH RECOGNITION DEVICE

BACKGROUND OF THE INVENTION

The invention relates to a product including at least one processing unit that can be driven to an active state, for which at least one operating state can be activated, and including a speech recognition device for controlling at least one processing unit as regards its at least one operating state while use is made of a command lexicon containing commands and depending as regards its contents on at least one activated operating state of at least one processing unit in its active state, and which recognition device includes a command lexicon memory in which commands of the command lexicon can be stored in the form of command information and identification information assigned to this command information, and which includes speech recognition means to which can be delivered at least speech information representing a command spoken by a speaker and which are arranged for detecting command information to be assigned to such speech information while use is made of identification information stored in the command lexicon memory and which speech recognition means are arranged for transferring detected command information to a processing unit while a processing-unit operating state corresponding to the spoken command can be activated by detected command information delivered to this processing unit.

The invention further relates to a speech recognition device which is arranged for cooperating with at least one processing unit that can be driven to an active state, for which at least one operating state can be activated, and which is arranged for controlling at least one processing unit as regards its at least one operating state while using a command lexicon comprising commands which depends as regards its contents on at least one activated operating state of at least one processing unit in its active state, and which speech recognition device includes a command lexicon memory in which commands of the command lexicon can be stored in the form of command information and identification information assigned to this command information, and which includes speech recognition means to which can be delivered at least speech information representing a command spoken by a speaker and which are arranged for detecting command information to be assigned to such speech information while use is made of identification information stored in the command lexicon memory and which speech recognition means are arranged for transferring detected command information to a processing unit while a processing-unit operating state corresponding to the spoken command can be activated by detected command information delivered to this processing unit.

The invention further relates to a method of generating a command lexicon for a speech recognition device, which speech recognition device is arranged for controlling at least one processing unit as regards its at least one operating state which processing unit can be driven to an active state—in which at least one operating state can be activated—while use is made of the command lexicon, the command lexicon containing commands which can be stored in the form of command information and identification information assigned to the command information, and the command information and the assigned identification information being stored in a command lexicon memory, and at least speech information spoken by a speaker and representing a command being delivered to speech recognition means, and the speech recognition means while using the identification information stored in the command lexicon memory detecting command information for such speech information and which detected command information can be delivered to a processing unit for activating the operating state of the processing unit corresponding to a spoken command.

Such a product and such a speech recognition device and such a method are known, for example, from the document EP 0 607 615 A1. In the known product the speech recognition device is arranged for cooperating with a plurality of processing units and is used for inputting text elements for building texts and for inputting commands for controlling a processing unit with respect to its operating states. Such a processing unit may be formed, for example, by a text processor implementing the Word program for Windows® or the Wordperfect® program or by a table processor implementing the Excels® program. To the speech recognition device can be connected a microphone by which speech information spoken by a user of the speech recognition device can be inputted in a command input mode as a command or in a text input mode as a text element for a processing unit. The speech recognition device includes speech recognition means which include a command lexicon memory in which the commands forming a command lexicon can be stored, that is, in the form of command information for controlling a processing unit and identification information assigned to this command information, which identification information is formed by socalled phonemes. Speech information inputted as a command by a user is processed in the speech recognition means and compared in the command input mode with identification information stored in the command lexicon memory, command information assigned to the speech information input as a command being generated and delivered to a processing unit for activating an operating state of the processing unit which state corresponds to the command.

Before the known speech recognition device is taken into operation for controlling a processing unit, the speech recognition device is to be adapted to this processing unit in a training mode and voice command processing means are to be added to this processing unit. In the training mode the known speech recognition device can be adapted to different processing units and, additionally, to different operating states of respective processing units so as to achieve a better recognition result of the speech recognition means. Therefore, in the training processing mode a user of the speech recognition device selects commands for an operating state of a processing unit, which commands can be used in this operating state and are suitable for changing the operating state of the processing unit. These commands are stored as command information in a collecting memory of command lexicons assigned to this operating state of this processing unit. Subsequently, the user can speak these commands as speech information into the microphone in the training mode and train the speech recognition means for these commands while identification information is generated which is stored in the collecting memory of command lexicons under the command information. All the command lexicons generated in the manner indicated for each operating state are stored in the collecting memory of command lexicons of the speech recognition device and assigned to the processing units and their operating states in a processing unit table.

When the operating state of a processing unit is changed—which was prepared for cooperating with the speech recognition device by an addition of speech command processing means and for which the known speech recognition device was prepared in the training mode—the processing unit sends information to the speech recognition device about what operating state the processing unit is in. While using the processing unit table, the speech recognition device then detects the command lexicon suitable for the present operating state, generated in combination with all the other command lexicons in the training mode and re-stores this command lexicon of the collecting memory of command lexicons in the command lexicon memory. When a user speaks a command for changing the operating state of the processing unit as speech information into the microphone, the result of the recognition of the spoken command is relatively high, because only a very small number of commands which the user selected for this operating state are used for speech recognition. Command information detected by the speech recognition means assigned to speech information representing a command is transmitted to the speech command processing means of the processing unit as a text element. The speech command processing means of the processing unit assign control information signal to the transmitted text element, which control information causes the command corresponding to the command information, thus the text element, to be processed in the processing unit, after which the operating state of the processing unit is changed in accordance with the processed command.

In the known speech recognition device, it has, however, been shown that generating a command lexicon for each operating state of a plurality of processing units costs very much time and is expensive. Furthermore, the use of the known speech recognition device is restricted to such processing units to which speech command processing means were added and for which command lexicons were generated. Furthermore, in the known speech recognition device all the generated command lexicons are to be stored and managed in the command lexicon collecting memory, for which purpose the known speech recognition device has both a relatively large memory and relatively complex control means.

SUMMARY OF THE INVENTION

It is an object of the invention to avoid the above difficulties and provide an improved product including a speech recognition device and including an improved speech recognition device and an improved method of generating a command lexicon for a speech recognition device.

This object is achieved according to the invention by a product as defined in the opening paragraph, in that generating means are provided which are arranged for generating—after an operating state of a processing unit has been activated—a command lexicon assigned to only this one activated operating state.

This object is achieved according to the invention by a speech recognition device as defined in the second paragraph in that generating means are provided which are arranged for generating—after an operating state of a processing unit has been activated—a command lexicon assigned to only this one activated operating state.

This object is achieved according to the invention by a method of the type defined in the third paragraph in that—after an operating state of a processing unit has been activated—a command lexicon assigned to only this one activated operating state is generated by the generating means.

This advantageously achieves that a command lexicon assigned to only a single operating state of a processing unit and exactly adapted to this operating state is generated each time after a new operating state of a processing unit has occurred and thus no training mode needs to be provided in which the speech recognition device is first to be prepared for cooperating with the processing unit. Furthermore, a collecting memory of command lexicons for storing a number of command lexicons for different operating states of processing units may be omitted. In addition, control means for managing a plurality of command lexicons may be omitted too. As a result of all these facts, a cost-effective product or a cost-effective speech recognition device can be realized.

BRIEF DESCRIPTION OF THE INVENTION

These and other aspects of the invention will be apparent from and elucidated with reference to the embodiments described hereinafter.

In the drawings:

FIG. 1 shows in a diagrammatic manner in the form of a block circuit diagram as a product according to the invention a personal computer in which a method according to the invention can be implemented and which includes a speech recognition device according to the invention, which speech recognition device is provided for controlling three processing units and has generating means for generating a command lexicon after a change from one operating state of a processing unit to another operating state of a processing unit.

FIG. 2 shows a processing window table stored in a processing window manager of a Windows processing unit of the personal computer as shown in FIG. 1.

FIG. 3 shows a switch area table which is stored in a switch area manager of the Windows processing unit of the personal computer shown in FIG. 1.

Figure 1:
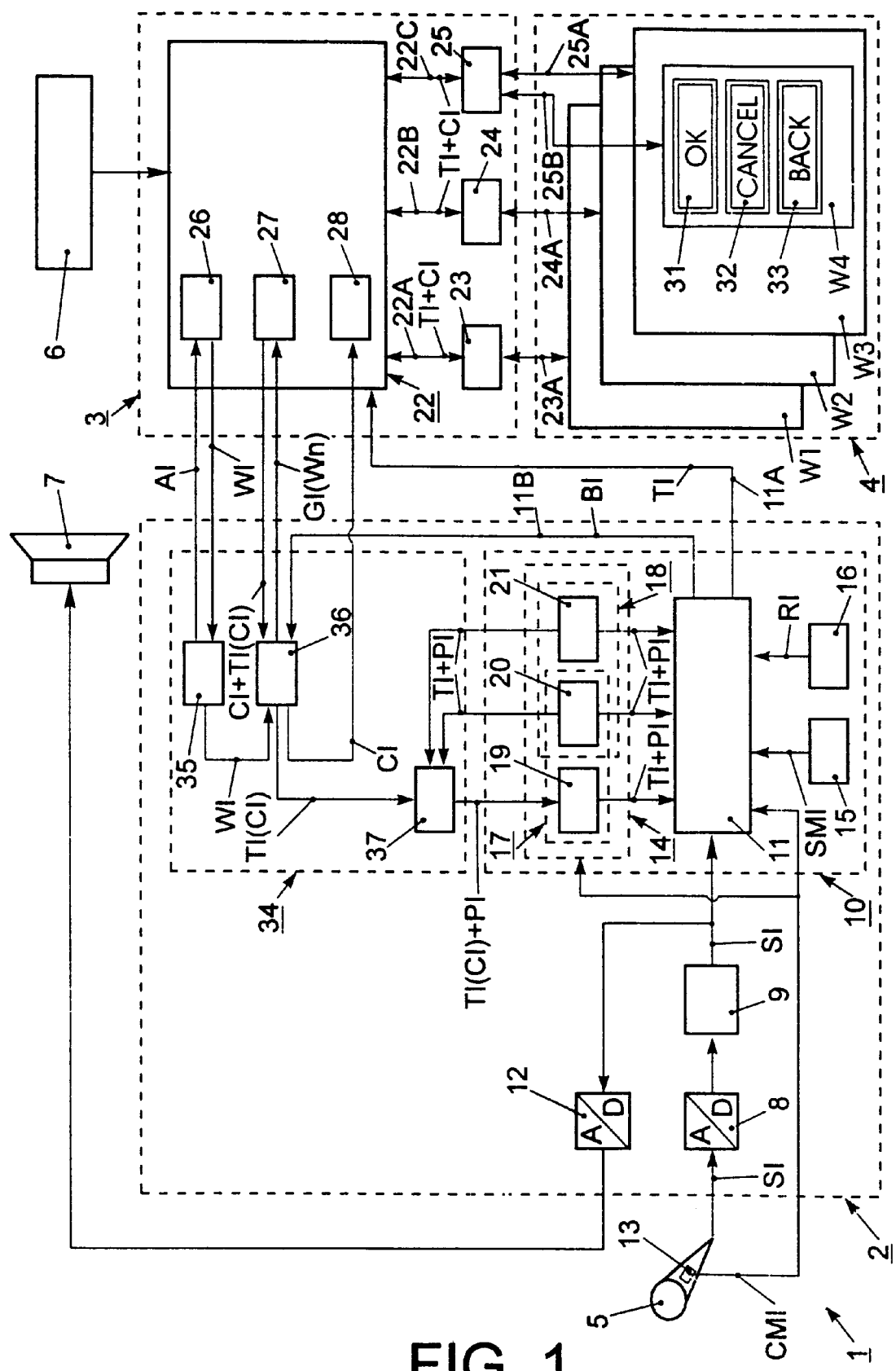
Figure 5:
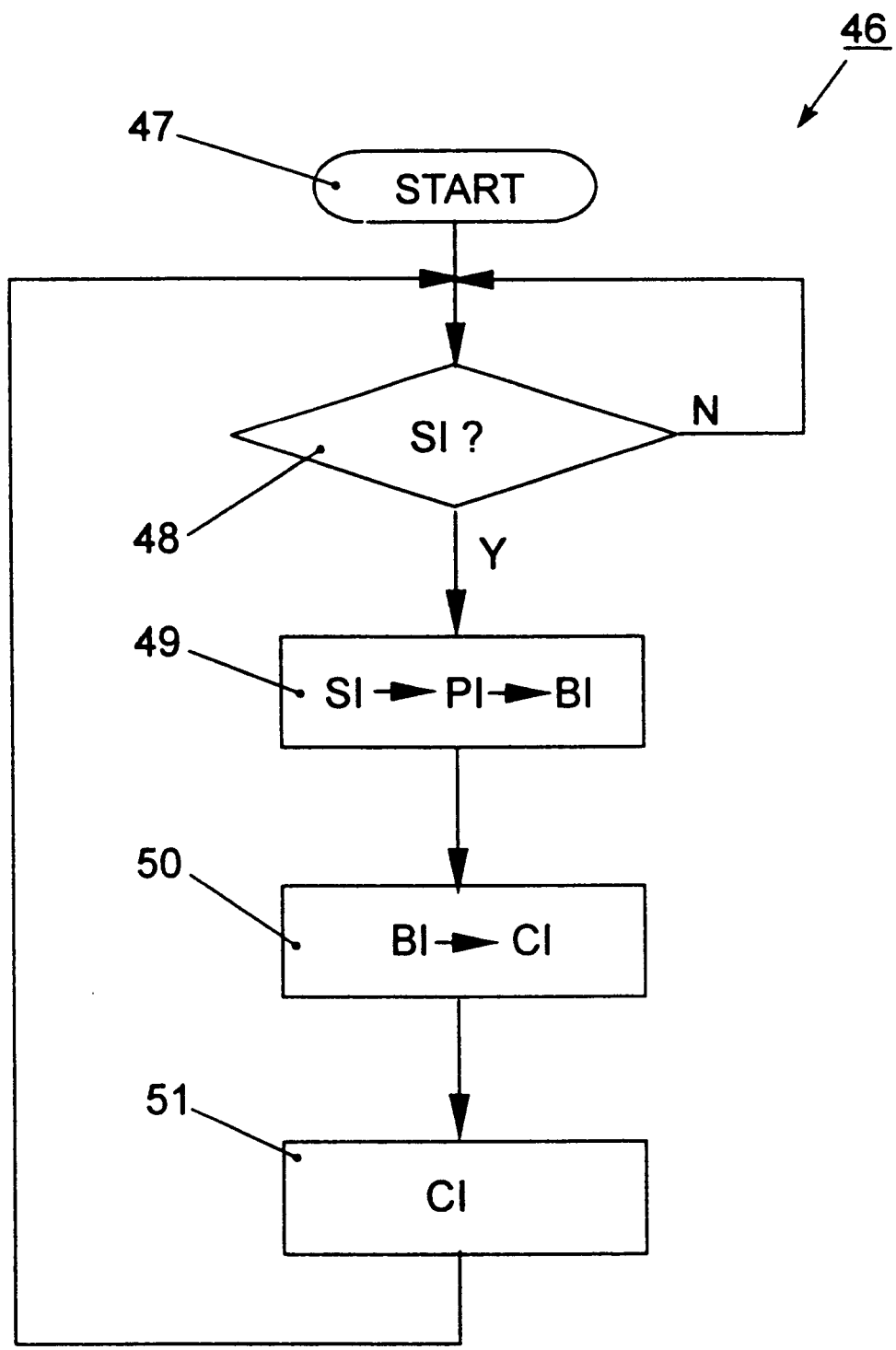

FIG. 5 shows a further flow chart by way of which a part of a method according to the invention can be explained which is implemented in the personal computer as shown in FIG. 1, utilizing a speech recognition device for recognizing speech information spoken by a speaker while a generated command lexicon is implemented, and for delivering control information to a processing unit to change this processing unit from one operating state to another operating state.

DESCRIPTION OF THE PREFERRED EMBODIMENTS

FIG. 1 shows a personal computer 1 which includes a speech recognition device 2 and a PC processing unit 3 and has a monitor 4 and to which is connected a microphone 5, a keyboard 6 and a loudspeaker 7.

The speech recognition device 2 of the personal computer 1 is used in the present case, inter alia, for controlling at least one processing unit with respect to its operating states using a command lexicon containing commands, which lexicon depends as regards its contents on an activated operating state of an active processing unit, which will be discussed in detail hereafter.

Analog speech information SI spoken by a speaker consisting of either a plurality of coherent words or separate words can be supplied by the microphone 5 to an analog/digital converter stage 8 of the speech recognition device 2.

Digital speech information SI can be sent by the analog/digital converter stage 8 to storage means 9 and be stored there.

Digital speech information SI read from the storage means 9 can be supplied to a digital/analog converter stage 12 in a speech playback mode which mode can be activated in a manner not further shown, and delivered as analog speech information SI to a loudspeaker 7 by this digital/analog converter stage 12.

Digital speech information SI read from the storage means 9, however, can also be supplied to speech recognition means 10 of the speech recognition device 2, that is, to a speech recognition stage 11 included in the speech recognition means 10. Commands represented by speech information and spoken by a speaker can be delivered to the speech recognition means 10. These speech recognition means 10 are arranged, inter alia, for detecting command information BI and thus actually a command to be assigned to a supplied command and representing such a command while using identification information PI stored in a command lexicon memory and for transferring to a processing unit the command information BI that represents a command while the detected command information BI—transferred to the processing unit and representing a command—may be instrumental in activating a desired operating state of the processing unit that corresponds with the spoken command.

The microphone 5 has a key 13 which can be actuated by a speaker for supplying a command input mode activating signal CMI by which a command input mode in the speech recognition device 2 is activated. Such command input mode activating information CMI can be fed to the speech recognition stage 11 by way of the key 13.

For detecting digital speech information SI delivered to the speech recognition means 10 and for assigning text information TI to detected speech information SI, the speech recognition means 10 include the speech recognition stage 11 and a lexicon memory 14, a speech model memory 15 and a reference memory 16. These three memories 14, 15 and 16 are connected to the speech recognition stage 11.

The lexicon memory 14 includes a command lexicon memory 17 and a text lexicon memory 18. The command lexicon memory 17 includes, on the one hand, a command vocabulary memory 19 and a basic vocabulary memory 20. The text lexicon memory 18 in this case also includes the basic vocabulary memory 20—which, however, need not necessarily be the case—and a text vocabulary memory 21.

For storing words, the lexicon memory 14 stores or can store text information TI and identification information PI assigned to the text information TI. This storing is in this case organized such that for each word text information TI is stored, that is, a so-called grapheme, and identification information PI assigned to the text information TI, i.e. a so-called phoneme sequence. It should be observed that organizing the word memory can also be effected in another way.

The basic vocabulary memory 20 stores a more or less large number of words representing basic expressions and forming a basic vocabulary and which are basic words in a text input mode that can be activated in a manner not further shown, which basic words form part of an overall text vocabulary recognizable with the speech recognition means 10 and which are basic commands in the command input mode which form part of an overall command vocabulary recognizable with the speech recognition means 10. The basic vocabulary memory 20 can store, for example, the word "help" which in the text input mode can be processed as a basic word by a processing unit arranged for this purpose, and in the command input mode by a suitably arranged processing unit as a basic command for displaying a help menu.

The text vocabulary memory 21 stores many words forming a text vocabulary which, together with the basic expressions, forms the overall text vocabulary recognizable by the speech recognition means 10 in the text input mode of the speech recognition device 2.

The command vocabulary memory 19 stores words forming a command vocabulary which, together with the basic expressions, forms the overall command vocabulary recognizable by the speech recognition means 10 in the command input mode of the speech recognition device 2. Worded differently, this is understood to mean that in the command input mode the basic command vocabulary formed by the basic expressions can be extended by commands stored in the command vocabulary memory 19 to form the overall command vocabulary. With such a command in the command input mode it is possible, for example, to activate a change from one operating state of a processing unit to another operating state of a processing unit thus, for example, reroute or switch over at least one processing unit from one operating state used thus far to a desired new operating state. These commands are suitable both for activating a desired operating state of a processing unit and for rerouting at least one processing unit with respect to its operating state to activate a desired operating state.

As already observed above, command input-mode activation information CMI generated by the key 13 is delivered to the speech recognition stage 11. From the speech recognition stage 11 this information is passed on to the lexicon memory 14. When command input-mode activation information CMI occurs in the command input mode, the command lexicon memory 17 of the lexicon memory 14 is connected to the speech recognition stage 11. In the absence of command input-mode activation information CMI in the text input mode, the text lexicon memory 18 of the lexicon memory 14 is connected to the speech recognition stage 11. In this manner it is ensured that the words forming each a command are stored in the command lexicon memory 17. For storing these command-forming words, command information BI is stored as text information and identification information PI assigned to the command information BI is stored in the command lexicon memory 17, that is, one command information signal BI and one assigned identification information signal PI for each word.

The speech model memory 15 stores speech model information SMI indicating the probability of the occurrence of a word after the occurrence of a certain combination or sequence of words recognized by the speech recognition stage 11. If during a speech recognition run the next word occurring in speech information SI that contains a plurality of successive words can equally probably be one of two words according to the information stored in the lexicon memory 14 and the reference memory 16, the speech recognition stage 11 will recognize the word that has the greater probability of occurrence according to the speech model information SMI.

Reference memory 16 stores reference information RI representing information about how a speaker pronounces one phoneme out of a sequence of phonemes. The speech recognition stage 11 is adapted to a speaker with the aid of the reference information RI.

The PC processing unit 3 of the personal computer 1 comprises a Windows processing unit 22 and a first processing unit 23, a second processing unit 24 and a third processing unit 25. When the personal computer 1 is activated, the Windows processing unit 22 is always driven to its active state. Each one of the other three processing units 23, 24 and 25 can be brought to an active state and can be controlled in its active state or switched to its operating state.

The Windows processing unit 22, which, in essence, features a program processing unit for processing a so-called Windows® program and which in this case is formed by the known Windows 95® program, is mainly used for managing the three processing units 23, 24 and 25 and includes processing window manager 26, a switch area manager 27 and a command manager 28. A processing window table 29 represented in FIG. 2 can be stored in the processing window manager 26. A switch area table 30 which is represented in FIG. 3 can be stored in the switch area manager 27. The command manager 28 is arranged for managing and implementing a command for the Windows processing unit 22 inputted by the keyboard 6 or by the speech recognition device 2 in the form of control information CI, or for transferring the inputted command in the form of control information CI to one of the three processing units 23, 24 and 25.

The three processing units 23, 24 and 25 which also represent, in essence, program processors are mainly used for driving four processing windows W1, W2, W3 and W4 and for preparing and producing graphics information and text information to enable the display of the graphics information and text information in the processing windows W1, W2, W3 and W4. For each of the three processing units 23, 24 and 25, different operating states can be switched on when in the active state. Depending on which processing unit 23, 24 and 25 it is, they are different operating states, for example, a decision operating state which will be further discussed in the following, or a print preparation operating state, or an operating state for opening at least one database, or a text input operating state.

The monitor 4 can display processing windows $W_n$ assigned to the three processing units 23, 24 and 25, in which FIG. 1 shows a first processing window W1, a second processing window W2, a third processing window W3 and a fourth processing window W4. Each of these four processing windows W1, W2, W3 and W4 can be driven to a processing state with the aid of the processing units 23, 24 and 25.

The fourth processing window W4 is a so-called decision processing window not used for inputting text, but inputting commands, and has a first switching area 31 with the text information "OK" and a second switching area 32 with the text information "CANCEL" and a third switching area 33 with the text information "BACK". The three processing units 23, 24 and 25 are connected to their assigned processing windows W1, W2, W3 and W4 by four connections 23A, 24A, 25A and 25B for transferring graphics information and text information to display this information in the processing windows W1, W2, W3 and W4. Both the third processing window W3 and the fourth processing window W4 are connected to the third processing unit 25 by the two connections 25A and 25B.

Text information TI recognized in the text input mode by the speech recognition stage 11 can be transferred from the speech recognition stage 11 by a connection 11A to the Windows processing unit 22 and from there via one of three further connections 22A, 22B and 22C to a processing unit 23, 24 and 25 respectively, driven to its active state, while this one processing unit 23 or 24 or 25 provides that a text corresponding to the recognized text information TI is shown in the respective processing window W1, W2 or W3 which can be activated by one of the connections 23A, 24A and 25A. It should be observed that always only one of the three processing units 23, 24 and 25 can be driven to its active state and always only one of the four processing windows W1, W2, W3 and W4 can be driven to its processing state.

The speech recognition device 2 at this point includes generating means 34 for generating a command lexicon assigned to—only the one—desired operating state of a processing unit 23, 24 or 25 corresponding to, for example, a spoken command or a command inputted by means of a key of the keyboard 6. The generating means 34 are formed by information processing means and include recognition means 35 and detection means 36 and further assigning means 37.

The recognition means 35 are provided for recognizing a processing state of a processing window W1, W2, W3 and W4 of a processing unit 23, 24 and 25 respectively, included in the speech recognition device 2. For this purpose, the recognition means 35 deliver log-on information AI to the processing window manager 26. The recognition means 35 further receive processing window information WI coming from the processing window manager 26 which is then transmitted when a processing unit 23, 24 or 25 in its active state is changed from one operating state to another. The processing window information WI then contains information about which of the four processing windows W1, W2, W3 and W4 is in its processing state and is therefore active, which fact can be recognized or detected by the recognition means 35 on the basis of the processing window information WI. Recognition means 35 can deliver such processing window information WI to the detection means 36.

The detection means 36 are arranged—for example after a change from one operating state of a processing unit 23, 24 or 25 to another operating state of a processing unit 23, 24, 25, thus after a desired operating state of a processing unit 23, 24, 25 has been activated, which can be effected, for example, with command information determined by means of a spoken command, but also by depression of a key of the keyboard 6—for detecting suitable command information—for activating at least a further operating state of at least one processing unit 23, 24, 25—which is in this case formed by text information TI(CI). The detection means 36 are further arranged for delivering the received text information TI(CI) to the assigning means 37.

The assigning means 37 to which the command information TI(CI) detected by the detection means 36 can be delivered are used for assigning identification information PI to the detected suitable command information TI(CI), while the identification information PI which is also formed by phoneme sequences can either be read in the present case from the text lexicon memory 18, or be generated with the aid of the assigning means 37. Furthermore, the assigning means 37 themselves are arranged for storing the detected suitable command information TI(CI) and the identification information PI in the command vocabulary memory 19 and thus in the command lexicon memory 17 and, as a result, for producing a command lexicon assigned only to the respectively activated operating state of a processing unit 23, 24 and 25.

As already observed above, processing window information WI can be delivered to the detection means 36 by the recognition means 35. When such processing window information WI occurs, the detection means 36 are arranged for delivering inquiry information $GI(W_n)$ to the switch area manager 27 and for receiving control information CI and detected suitable text information TI(CI) from the switch area manager 27 and for storing this information which will be discussed in more detail in the following. The text information TI stored in the basic vocabulary memory 20 is also stored in the detection means 36. For this purpose, it should be emphasized in this respect that control information CI was assigned to this text information TI in an initialization routine, and that, furthermore, the text information TI and the control information CI was stored in the detection means 36 while assigned to each other.

The assigning means 37 are arranged for comparing the received text information TI(CI) with the text information TI stored in the text lexicon memory 18 and, when they match, for reading the text information TI and the assigned identification information PI, thus the assigned phoneme sequence, from the text lexicon memory 18. When the received text information TI(CI) is not found in the text lexicon memory 18, the assigning means 37 themselves provide that assigning information PI to be assigned to the text information TI(CI) is generated, thus phoneme sequences are generated. A phoneme subsequence assigned to the same or a similar text portion of text information TI in the text lexicon memory 18 is then assigned to text portions of text information TI(CI). This method of generating phoneme sequences assigned to text information TI(CI) has been known to a person of ordinary skill in the art for a long time. The text information TI(CI) and the assigned phoneme sequences, thus the assigned identification information PI, can be stored in the command vocabulary memory.

Text information which here forms command information BI recognized by the speech recognition stage 11 in the command input mode can be delivered to the detection means 36 by the speech recognition stage 11 via a further connection 11B. The detection means 36 are arranged for comparing the command information BI supplied thereto by the further connection 11B with the detected suitable text information TI(CI) stored in the detection means 36. With a positive result of the comparison, the detection means 36 deliver control information CI assigned to the command information BI and stored in the detection means 36 to the command manager 28, which will be further discussed in the following. An operating state of a processing unit 23, 24, 25 can be triggered with the control information CI.

Figure 4:
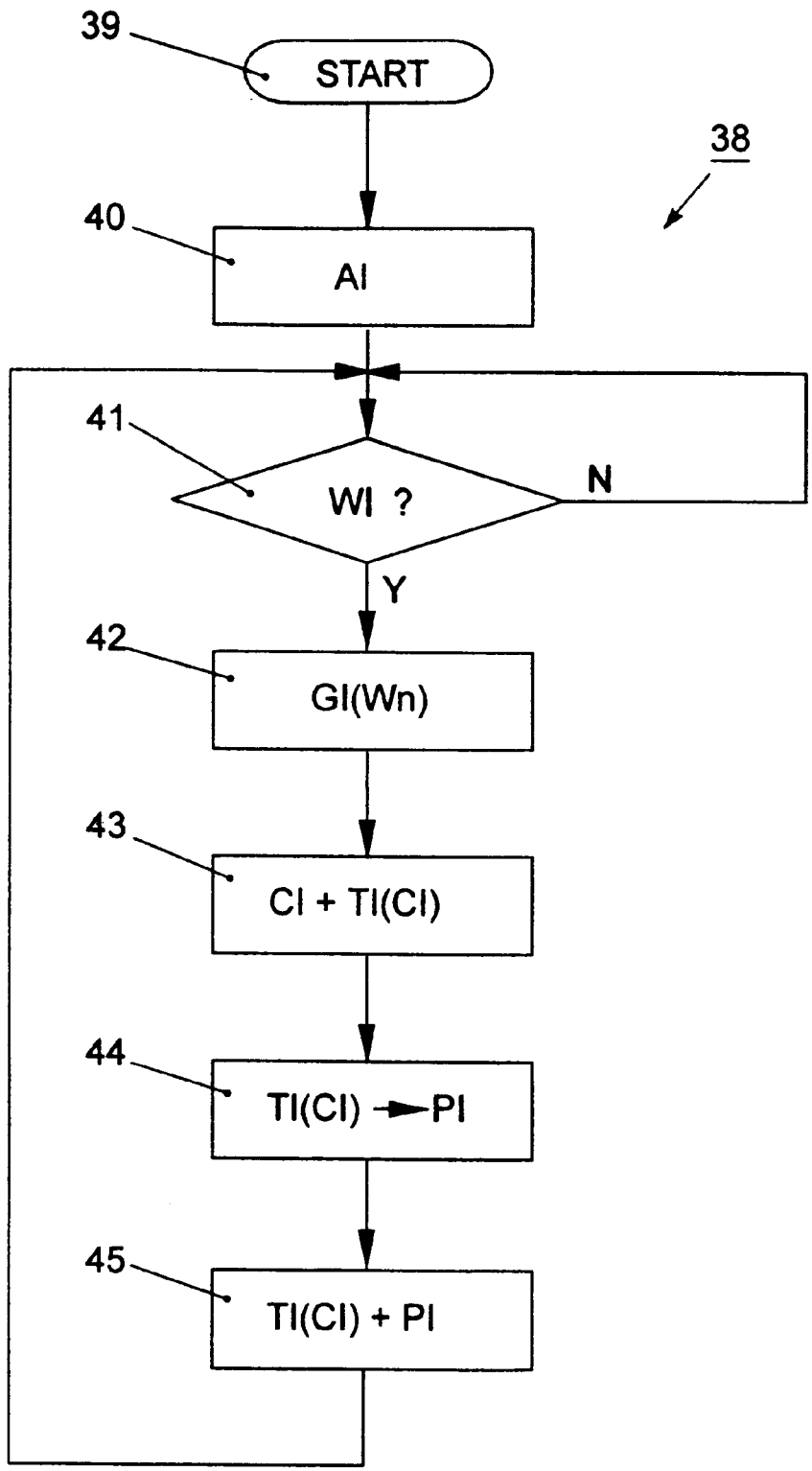
FIG. 4 shows a flow chart by way of which at least an essential part of a method according to the invention can be explained which is implemented in the personal computer as shown in FIG. 1 while its speech recognition device is used for generating a command lexicon.

A program run in the personal computer 1 including the speech recognition device 2, which program run is made for generating and storing a command lexicon adapted to an operating state of a processing unit 23, 24, 25 driven to its active state, thus assigned to this operating state, will be described in the following with reference to the flow chart 38 shown in FIG. 4.

The program run starts with a block 39 when the speech recognition device 2 is activated for inputting speech information SI in the personal computer 1. At a next block 40, the recognition means 35 send log-on information AI to the processing window manager 26. The log-on information AI contains information about what information occurring in the processing window manager 26 is to be transferred to the recognition means 35 during the further processing. The log-on information AI particularly contains information that processing window information WI occurring in the processing window manager 26 is always to be transported to the recognition means 35 during the further process.

In the processing window manager 26 is stored the processing window table 29 which is represented in FIG. 2. A column AP of the processing window table 29 states programs which can be processed in the processing units 23, 24 and 25 to which processing windows $W_n$ are assigned. The first processing unit 23 is formed with the aid of the "Excel for Windows®" program to which a first processing window W1 is assigned in a column $W_n$ of the processing window table 29. The second processing unit 24 is formed by way of the "Internet Explorer®" program to which a second processing window W2 is assigned in the column $W_n$ of the processing window table 29. The third processing unit 25 is formed with the aid of a "Word for Windows®" program to which a third processing window W3 and a fourth processing window W4 are assigned in the column $W_n$ of the processing window table 29. It is assumed that the third processing unit 25 is driven to its active state. The fourth processing window W4 is featured in the processing window table 29 in a column AK by means of an arrow as an active processing window for text input in the text input mode or for a command input in the command input mode. Since the fourth processing window W4 is a decision processing window, only one command can be inputted in the command input mode. In the active state of the third processing unit 25, the user of the personal computer 1 is expected to input a command whether a certain processing is to be performed, which can be effected by an activation of the first switching area 31 having the text information "OK". Such a specific processing may be, for example, the loading of a document in the main memory of the personal computer 1 for further processing of the text of this document. A command input may also be the activation of the second switching area 32 having the text information "CANCEL", as a result of which the specific processing is interrupted. Also the third switching area 33 having the text information "BACK" can be activated by inputting a command, so that the specific processing is not carried out and a return is made to the previous operating state of the third processing unit 25.

In a block 41 following block 40, the recognition means 35 check whether processing window information WI comes from the processing window manager 26. As long as this is not the case, the program run remains in block 41. The processing window manager 26 produces processing window information WI when log-on information AI occurs and in the case described here when the active-state processing unit 25 is changed from one operating state to another operating state. It should be observed that the processing window manager 26 also produce processing window information WI when either one of the other two processing units 23 or 24 is driven to the active state. When processing window information WI occurs, the program run is continued in block 42.

In block 42 the processing window information WI of the fourth processing window W4, driven to its processing state and therefore active, is transferred from the recognition means 35 to the detection means 36. When processing window information WI occurs, the detection means 36 deliver interrogation information $GI(W_n)$ relating to the respective active processing window $W_n$, thus in this case interrogation information GI(W4) of the active fourth processing window W4, to the switching area manager 27. The switching area table 30 which is shown in FIG. 3 is stored in the switching area manager 27. One column $W_n$ of the switching area table 30 states the processing windows W1, W2, W3 and W4 managed by the switching area manager 27, which windows belong to the processing units 23, 24 and 25 which cooperate with the Windows processing means 22. One column TI(CI) of the switching area table 30 states text information TI(CI) for the processing windows W1, W2, W3 and W4 which is assigned to switching areas which are also known as controls and to other elements of the processing windows W1, W2, W3 and W4 such as, for example, a menu list or a so-called pull-down menu. Each text information TI(CI) in the switching area table 30 is assigned to control information CI which is produced when a switching area is activated by the user on the processing means assigned to the respective processing window $W_n$, and leads to the execution of the command of the activated switching area. As appears from the switching area table 30, the first switching area 31 having text information "OK" is assigned control information "30". When a user of the personal computer 1 depresses, for example, a key of keyboard 6 for activating the first switching area 31, the command manager 28 transfers the control information "30" to the third processing unit 25 to change the operating state of the third processing unit 25.

In a block 43 following block 42, the switching area manager 27 detects the text information TI(CI) in the switching area table 30 and the assigned control information CI of the fourth processing window W4 when interrogation information GI(W4) occurs, and transports this to the detection means 36. The detected text information TI(CI) and the assigned control information CI transported to the detection means 36 and suitable for activating a further operating state of the third processing unit 25 is stored in the detection means 36 and the detected suitable text information TI(CI) is transferred to the assigning means 37. Consequently, the text information "OK" "CANCEL" and "BACK" is in this case transferred to the assigning means 37.

In a block 44 following block 43, the detected suitable text information TI(CI) is assigned identification information PI, thus phoneme sequences. In a first step a test is made whether detected suitable text information TI(CI) has already been stored in the text lexicon memory 18. If such text information TI(CI) has already been stored in the text lexicon memory 18, and therefore found, the identification information PI assigned to the text information TI in the text lexicon memory 18 and representing a phoneme sequence is read from the text lexicon memory 18 and assigned to the text information TI(CI) found. If such text information TI(CI) is not found in the text lexicon memory 18, identification information PI representing a phoneme sequence is generated by the assigning means 37 themselves and assigned to the text information TI(CI) not found, as this has already been explained before.

In a block 45 following block 44, the detected suitable text information TI(CI) and the identification information PI assigned to this text information TI(CI) in block 44 is stored in the command vocabulary memory and thus in the command lexicon memory 17. In this manner, the command lexicon generated by the generation means 34 is stored in the command vocabulary memory in the case described here only for the activated operating state of the third processing unit 25, so that the contents of the command lexicon memory 17 are adapted to the activated operating state of the third processing unit 25. After the block 45 has been executed, the program run is continued with block 41.

In accordance with the inventive method described above, a speech recognition device 2 according to the invention automatically generates a command lexicon adapted to the activated operating state of a processing unit driven to its active state immediately after the occurrence of an operating state of this processing unit. Such an adapted command lexicon is automatically generated in advantageous manner also when an operating state of a formerly active processing unit is changed to an operating state of another processing unit driven to its active state. As a result, the command vocabulary stored in the command vocabulary memory is adapted to the respective active processing window $W_n$ as a result of which an extremely high recognition rate is achieved with a next speech recognition run for the recognition of command information BI input as speech information SI in the command input mode.

A program run for executing a speech recognition operation in the personal computer 1 with the speech recognition device 2 in the command input mode will be described hereafter with reference to a flow chart 46 shown in FIG. 5.

The program run starts with a block 47 when a speaker, by depressing the key 13, causes command input-mode activation information CMI to show up in the speech recognition device 2, as a result of which the command input mode is activated. In a block 48 following block 47, a test is made in the speech recognition stage 11 whether speech information SI has already occurred and was stored in the storage means 9. As long as this is not the case, the program run remains in block 48. When, in contrast, speech information SI has indeed occurred and been stored in the storage means 9, the program run is continued with block 49. In block 49 the speech recognition stage 11 assigns at least one phoneme sequence to speech information SI read from the storage means 9 by using reference information RI stored in the reference memory 16. This at least one assigned phoneme sequence is compared with phoneme sequences which are stored in the form of identification information PI in the command lexicon memory 17 connected to the speech recognition stage 11 in the command input mode. If a phoneme sequence detected on the basis of speech information SI matches the phoneme sequence stored in the command lexicon memory 17, the text information assigned to the stored phoneme sequence also stored in the command lexicon memory 17 is read from the command lexicon memory 17 as recognized text information by the speech recognition stage 11. Such recognized text information forms command information BI which, in the command input mode, is delivered by the speech recognition stage 11 to the detection means 36 over the further connection 11B.

In a block 50, the detection means 36 compare the recognized command information BI with the text information stored in the detection means 36. The detected command information BI is compared with all the text information stored in the detection means 36, so both with the detected suitable text information TI(CI) which was shown in the active fourth processing window W4, and with the text information TI stored in the detection means 36 during an initialization routine. If a match is found between the recognized command information BI and text information stored in the detection means 36, the program routine is carried on in block 51.

In the block 51 the detection means 36 transmit the control information CI assigned to the stored text information to the command manager 28 for processing the control information CI. The command manager 28 sends the control information CI to the third processing unit 25 brought to its active state, to drive or switch-over the third processing unit 25 from one operating state to another. After block 51 the program routine is continued with block 48.

When a speaker touches the key 13 and speaks the word "OK" into the microphone 5, the speech recognition stage 11 compares the phoneme sequence generated by it with this speech information SI with phoneme sequences stored in the command vocabulary memory and the basic vocabulary memory 20, thus in the command lexicon memory 17 stored in the form of identification information PI. In the command vocabulary memory are stored the phoneme sequences to the commands "OK", "CANCEL" and "BACK". As a result of the very small amount of command information BI recognizable by the speech recognition stage 11 and stored in the command lexicon memory 17, the recognition rate is very high because of which the speech recognition stage 11 recognizes very fast and reliably the phoneme sequence to the word "OK" as corresponding to the detected phoneme sequence. The text information "OK" assigned to this phoneme sequence is sent to the detection means 36 by the speech recognition stage 11. A comparison in the detection means 36 yields that the command information BI corresponding with the text information "OK" matches the text information TI(CI) of the first switching area 31 of the active fourth processing window W4 stored in the detection means 36. The control information "30" assigned to the text information TI(CI) is then transferred from the detection means 36 to the command manager 28 to execute the control information "30". The command manager 28 transfers the control information "30" to the third processing unit 25 in which the command "OK" represented by the control information "30" is executed. It makes no difference here for the third processing unit 25 whether the transfer of the control information "30" to the third processing unit 25 was effected by actuating the first switching area 31, by actuating at least one key of the keyboard 6, or by speech from a speaker.

This advantageously achieves that the speech recognition device 2 delivers to this processing unit control information CI as command information BI for controlling a processing unit, which control information in the processing unit immediately leads to an execution of the command spoken by a speaker. Therefore it is not necessary to prepare a processing unit for cooperating with a speech recognition device 2 according to the invention by providing speech command processing means in the way it is necessary for processing units to cooperate with known speech recognition devices in many cases. This enables the use of a speech recognition device 2 according to the invention in any Windows processing unit.

The speech recognition device 2 according to the invention advantageously cooperates with a plurality of processing units 23, 24 and 25, in which the recognition means 35 detect the active processing window $W_n$ of a processing unit 23, 24 or 25 driven to its active state and command information BI inputted as speech information SI becomes effective only for a processing unit 23, 24 or 25 driven to its active state.

The generation means 34 of a speech recognition device 2 according to the invention may have a very simple structure as this is shown in FIG. 1 when they are arranged for cooperating with a Windows processor 22 which may be realized, for example, with the aid of the Windows 95® program. This is caused by the fact that the Windows 95® program renders the processing window information WI as well as text information TI(CI) and assigned control information CI of the active operating window $W_n$ available, which is necessary for generating a command lexicon.

Accordance to a second example of embodiment of the invention, a speech recognition device is arranged for controlling a processing unit formed by a so-called Internet Browser. The speech recognition device according to the second example of embodiment then has the same structure as the speech recognition device according to the first example of embodiment of the invention shown in FIG. 1, whereas, however, a personal computer containing the speech recognition device in accordance with the second example of embodiment and the Internet Browser is connected to the computer network Internet.

The Internet Browser is used for detecting information stored in storage means, so-called servers, connected to the Internet, so-called Internet Home Pages. An Internet Home Page contains text information and graphics information and optionally also video information. The Internet Browser is arranged for detecting an Internet Home Page which is featured by a specific Internet address a so-called URL. The Internet Browser is realized in the second example of embodiment of the invention with the aid of the known Windows "Microsoft Internet Explorer®" program. A plurality of programs further suitable for realizing an Internet Browser, such as, for example, Netscape®, are also known.

Text information of an Internet Home Page may form command information when an Internet address of a further Internet Home Page is assigned to the text information. Such text information may be shown in a specific way—for example underlined—on an Internet Home Page when it is displayed on a monitor connected to the personal computer, to draw the user's attention to the fact that by activating this text information a further Internet Home Page can be detected by the Internet Browser. An Internet address assigned to text information then forms control information which—when delivered to the Internet Browser—leads to the Internet Browser detecting the Internet Home Page assigned to this Internet address and thus changes the operating state of the Internet Browser.

The speech recognition device according to the second example of embodiment of the invention includes detection means which, after detecting an Internet Home Page with the Internet Browser, detect text information forming command information found on the Internet Home Page. Since the Internet Browser is formed with the aid of the "Microsoft Internet Explorer®" Windows program, the detection means of the speech recognition device according to the second example of embodiment and also the detection means of the speech recognition device according to the first example of embodiment are arranged for detecting the command information of a Windows processor.

The speech recognition device according to the second example of embodiment further has assigning means corresponding to the assigning means of the speech recognition means in accordance with the first example of embodiment, which detects or generates in the speech recognition device in accordance with a second example of embodiment assigning information for the text information that forms command information, so that the speech recognition device according to the second example of embodiment is arranged for generating a command lexicon adapted to an Internet Home Page detected by an Internet Browser.

The detection means are further arranged for detecting an Internet address which is assigned to text information that forms command information on an Internet Home Page detected last by the Internet Browser. In addition, the detection means are also arranged for the speech recognition means of the speech recognition device to compare text information representing a command to be executed and assigned to speech information in accordance with the first example of embodiment of the invention with text information detected by the detection means and, in the event of a positive result of the comparison, to deliver an Internet address assigned to text information representing a command to be executed—which Internet address is used for detecting an Internet Home Page assigned to the Internet address with the Internet Browser—to the Internet Browser.

In consequence, the advantages explained above with reference to the first example of embodiment are also achieved when an Internet Browser is controlled by commands spoken by a speaker.

It should be observed that a speech recognition device according to the invention may also be arranged for controlling a processing unit that is not arranged for cooperating with a Windows processing unit. Processing units are referred to here which cooperate with a Unix operating system.

Furthermore it should be observed that detected suitable text information TI(CI) can be detected not only on a so-called list or a so-called pull-down menu, but

What is claimed is:

1. A product, comprising:
   at least one processing unit operable to be activated from a first operating state to a second operating state in response to a control information;
   a speech recognition device operable to provide said control information to said at least one processing unit in response to a first speech information for activating said at least one processing unit to said second operating state,
   wherein said speech recognition device is further operable to generate a command lexicon exclusively corresponding to said second operating state after an activation of said at least one processing unit to said second operating state in response to said first speech information.

2. The product of claim 1, wherein said speech recognition device includes
   a recognition means for recognizing said activation of said at least one processing unit to said second operating state .

3. The product of claim 1, wherein
   said command lexicon includes a command information corresponding to said second operating state; and
   said speech recognition device includes a detection means for detecting said command information and said control information after said activation of said at least one processing unit to said second operating state in response to said first speech information.

4. The product of claim 3, further comprising:
   a windows processing unit for providing said command information and said control information to said detection means in response to an interrogation information from said detection means.

5. The product of claim 3, wherein
   said command lexicon further includes an identification information; and
   said speech recognition device further includes an assigning means for assigning said identification information to said command information.

6. The product of claim 5, wherein
   said speech recognition device further includes a command lexicon memory for storing said command information and said identification information.

7. The product of claim 6, wherein
   said speech recognition device further includes a speech recognition means for retrieving said command information from said command lexicon memory and providing said command information to said detection means in response to a second speech information for activating said at least one processing unit to said second operating state.

8. The product of claim 7, further comprising:
   a windows processing unit operable to activate said at least one processing unit to said second operating state in response to said control information,
   wherein said detection means provides said control information to said windows processing unit in response to said command information.

9. The product of claim 1, further comprising:
   a monitor for displaying a first processing window and a second processing window,
   wherein said at least one processing unit includes a first processing unit operable to be activated to said first operating state to drive said first processing window and to be activated to said second operating state to drive said second processing window.

10. The product of claim 1, further comprising:
    a monitor for displaying a first processing window and a second processing window,
    wherein said at least one processing unit includes
      a first processing unit operable to be activated to said first operating state to drive said first processing window, and
      a second processing unit operable to be activated to said second operating state to drive said second processing window.

11. A speech recognition device, comprising:
    a means for receiving a first speech information for activating at least one processing unit from a first operating state to a second operating state;
    a means for controlling a first activation of said at least one processing unit to said second operating state in response to said first speech information; and
    a means for generating a command lexicon exclusively corresponding to said second operating state after said first activation of said at least one processing unit to said second operating state.

12. The speech recognition device of claim 11, further comprising:
    a means for detecting a command information corresponding to said second operating state after said first activation of said at least one processing unit to said second operating state,
    wherein said command lexicon includes said command information.

13. The speech recognition device of claim 12, further comprising:
    a means for assigning an identification information to said command information,
    wherein said command lexicon further includes said identification information.

14. The speech recognition device of claim 13, further comprising:
    a means for storing said command information and said an identification information.

15. The speech recognition device of claim 14, further comprising:
    a means for receiving a second speech information subsequent to receiving said first speech information, said second speech information for activating said at least one processing unit to said second operating state; and
    a means for utilizing said command information and said identification information as stored to control a second activation of said at least one processing unit to said second operating state in response to said second speech information.

16. A method, comprising:

receiving a first speech information for activating at least one processing unit from a first operating state to a second operating state;

controlling a first activation of said at least one processing unit to said second operating state in response to said first speech information; and generating a command lexicon exclusively corresponding to said second operating state after said first activation of said at least one processing unit to said second operating state.

17. The method of claim 16, further comprising:

detecting a command information corresponding to said second operating state after said first activation of said at least one processing unit to said second operating state, wherein said command lexicon includes said command information.

18. The method of claim 17, further comprising:

assigning an identification information to said command information, wherein said command lexicon further includes said identification information.

19. The method of claim 18, further comprising:

storing said command information and said an identification information.

20. The method of claim 19, further comprising:

receiving a second speech information subsequent to receiving said first speech information, said second speech information for activating said at least one processing unit to said second operating state; and utilizing said command information and said identification information as stored to control a said at least one processing unit to said second operating state in response to said second speech information.

* * * * *